June 3, 1930. T. J. CHRUL 1,761,613
MANUAL STIRRER AND CONTAINER FOR SIRUPS
Filed Feb. 15, 1928 2 Sheets-Sheet 1

INVENTOR.
BY
ATTORNEYS.

Patented June 3, 1930

1,761,613

UNITED STATES PATENT OFFICE

TEOFIL J. CHRUL, OF BALTIMORE, MARYLAND

MANUAL STIRRER AND CONTAINER FOR SIRUPS

Application filed February 15, 1928. Serial No. 254,395.

This invention relates to certain new and useful improvements in manually operated stirring devices and a container therefor, for sirups or the like, to agitate and thoroughly stir said sirups in the initial process of making candies, etc.

The primary object of this invention is the provision of a container having a cooling chamber in which a cooling medium is forced, and a horizontally positioned manually operated agitating means located in said container.

A further object of the invention is the provision of a sirup container equipped with a cooling medium and agitating or stirring means, removably associated with said container and manually operated so that the sirups in said container may be thoroughly stirred or agitated.

A still further object of the invention is the provision of a sirup stirrer equipped with a removable operating member and removable paddles, whereby the device may be easily and quickly cleaned and the paddles interchanged or adjusted relative to the container, when it is found necessary.

A still further object of the invention is the provision of a pair of nesting containers constituting a cooling medium chamber, so that the contents of one of the containers may be cooled during the stirring or agitating process.

A still further object of this invention is the provision of a manually operated sirup stirrer, which can be manufactured and sold at a comparatively small cost.

With these and other objects in view, the invention consists in certain novel features, combination and arrangement of parts as will be hereinafter more fully described, illustrated in the accompanying drawings, and claimed.

In the drawings—

Figures 1, 2:
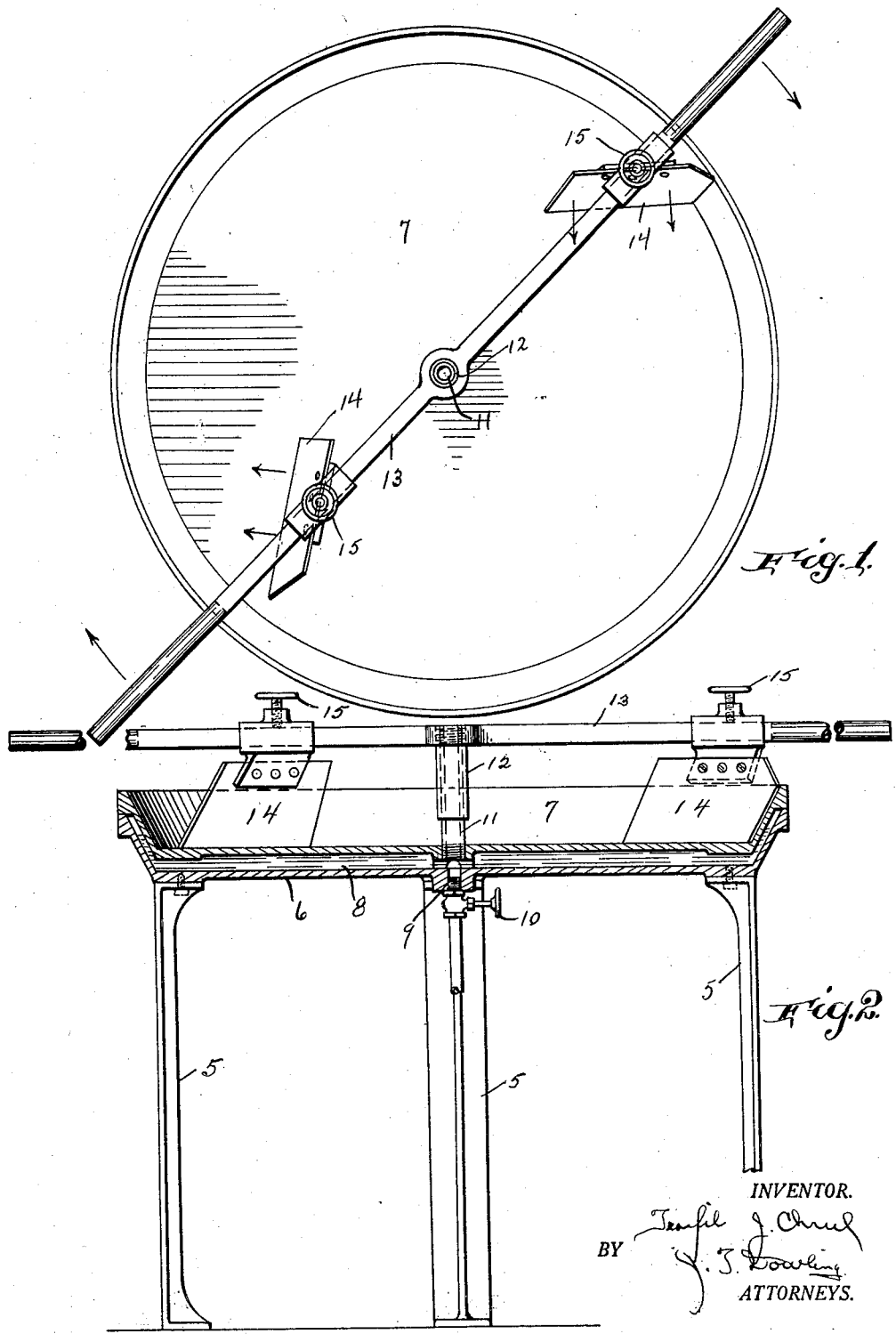
Figure 1 is a top plan view of my improved sirup container and stirrer, as made in accordance with this invention.
Figure 2 is a transverse sectional view of the invention.

Referring to the drawings, the numeral 5 indicates a series of supports having secured to their upper ends, an open end container 6 having diverging side walls in cross section, constituting a container. Nesting in this container 6 is the inner or second container 7, and this container 7 fits within the container 6, as illustrated, and is supported therein so as to provide a sufficient cooling space 8, in which a cooling medium is adapted to be forced.

The container 6 is provided centrally with an outlet pipe 9 controlled by a suitable valve 10, and the container 7 has fitted in its central axis, a vertical pipe 11 having rotatably fitted thereon a sleeve 12, to which sleeve is removably secured, a horizontally positioned handle 13, the opposite ends of said handle extending beyond the outer periphery of said containers for such a distance as to provide sufficient leverage to permit this handle to be rotated when pressure is applied thereon through the medium of the sleeve 12.

The vertical pipe 11 permits a cooling medium to have entrance to the cooling chamber 8, so that the contents of the container 7 may be cooled, and the valve 10 permits this cooling medium to be drawn from the cooling space when the operation is completed.

Slidably mounted on the handle 13, are paddles 14, which are adjustably fixed to said handle 13 through the medium of fastening means 15. By virtue of the fastening means 15, the paddles 14 may be moved inwardly through the central axis of said container or outwardly towards the outer circumference thereof.

The angularities of the paddles 14 are disposed in opposite directions, as clearly illustrated in Figure 1, so that when the handle is turned in the direction indicated by the arrows, the contents of the container 7 will be moved in opposite directions, as illustrated by the positions of the paddles in Figure 1.

In other words, when sirup is placed in the container 7, and upon the initial rotational motion of the handle 13, the sirup will be agitated inwardly by one paddle towards the central axis of the container 7, while the other paddle, due to its relative position thereto, will urge the sirup in the direction of the outer circumference of the container.

By continuous rotational motion of the handle, the sirup in the container 7 is sufficiently agitated to turn it into a homogeneous mass.

The principle involved is the simplicity of the structure and its cheapness, so as to permit candy sirups to be thoroughly stirred and agitated manually.

Figure 3:
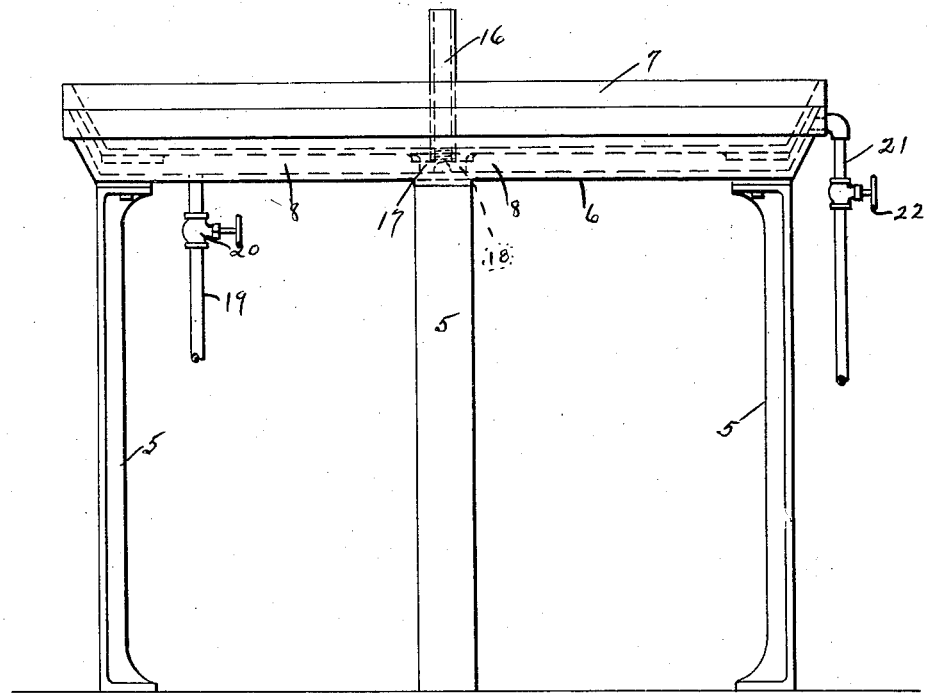
Figure 3 is a side elevational view of a slightly modified form of this invention; and, Figure 4 is an enlarged detailed sectional view, illustrating the construction of one form of the cooling medium.
Figure 4:
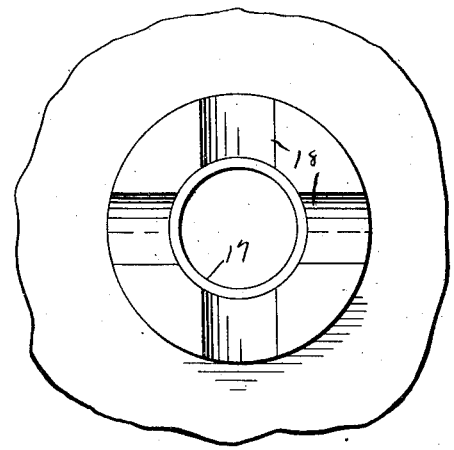

Referring to the modification illustrated in Figures 3 and 4, respectively, the usual standards 5 are provided, having the containers 6 and 7, respectively, and these containers nest in the same relative proportions as in the preferred form and provide a cooling chamber 8. The container 7 is provided with a standard 16, on which is rotatably mounted the usual handle 13, carrying the adjustable paddles 14. The bottom face of the container 7 is provided on its central axis, with a boss 17 equipped with a plurality of intersecting pipes 18, which communicate with the cooling chamber 8.

This boss 17 is provided so as to provide a continuous cooling medium in said chamber 8, by virtue of an inlet pipe 19, controlled by a valve 20 connected to and communicating with said chamber through the bottom wall of the container 6, and the overflow of this cooling medium is conducted outwardly through an outlet pipe 21 secured to and communicating with the chamber 8 through the wall of the container 7, and this overflow is controlled by a valve 22, and by virtue of the valves 20 and 22, respectively, the cooling medium may be held stationary in the chamber 8 of the modified form, if it is so desired.

The structure involved in the modified form is identical with that in the preferred form, with the exception of the cooling medium and its means of entrance and egress in and from the cooling chamber.

In use sirup is placed within the container 7 and a cooling medium is located in the chamber 8, the handle 13 carrying the paddles 14 is then placed on the pipe 11 for rotation thereon; the operators grasp the handle 13, causing the same to be rotated and by virtue of the paddles carried thereby the sirup in the container 7 is thoroughly agitated and stirred to its proper consistency.

Having thus described my invention, what I claim as new is:

A sirup mixer comprising standards, an open end container secured to the standards, a sirup container telescopically fitted in said first named container and having its peripheral flange overlying the peripheral edge of said first named container so as to support the walls of the sirup container from the adjacent walls of said first named container, said spacing of the walls providing a cooling chamber between the containers, means for conveying a cooling medium to said chamber, said means being associated through and with the side walls of the container, an outlet for said cooling means formed in the bottom wall of said first named container, a vertical pipe secured through and to the central axis of the bottom wall of the sirup container, a horizontally positioned handle secured to said pipe and extending beyond the peripheral edges of said containers, and stirring paddles secured to and depending from said handle and located within said sirup container.

In testimony whereof he hereunto affixes his signature.

TEOFIL J. CHRUL.